United States Patent Office 3,424,280
Patented Jan. 28, 1969

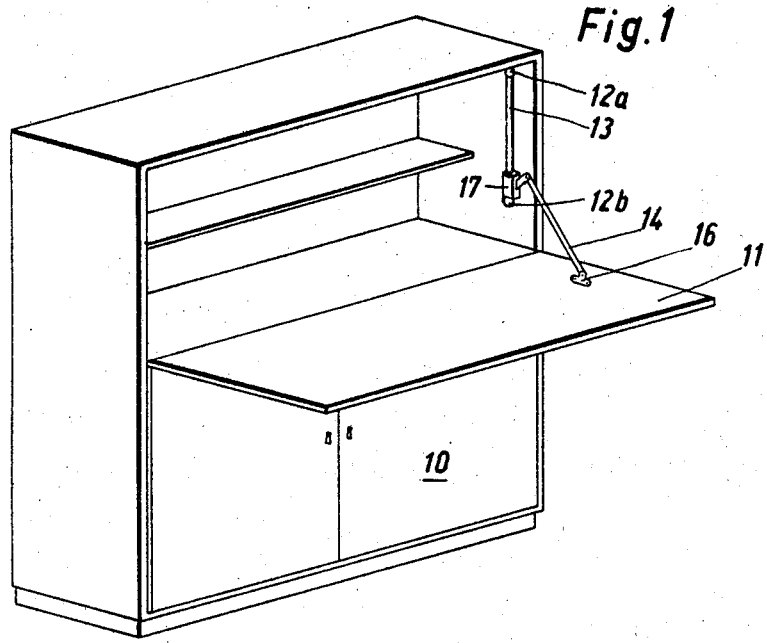
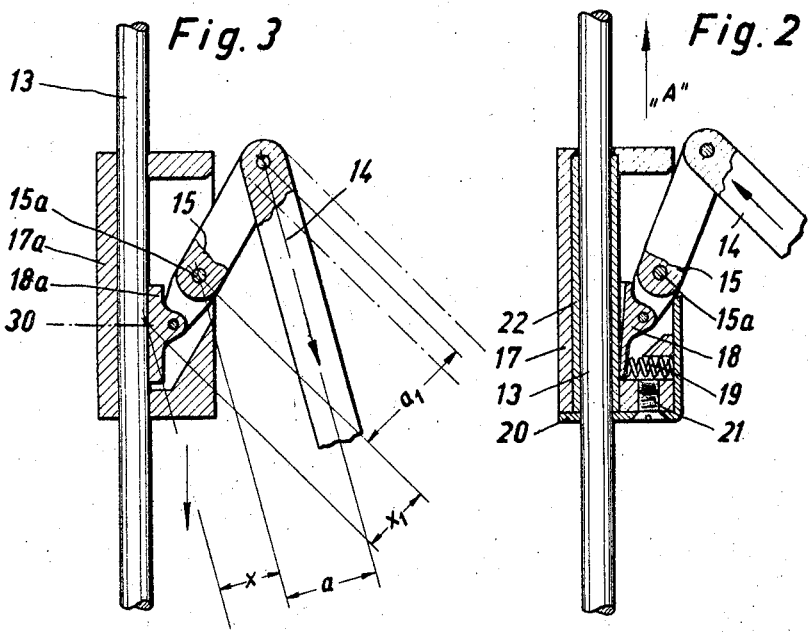

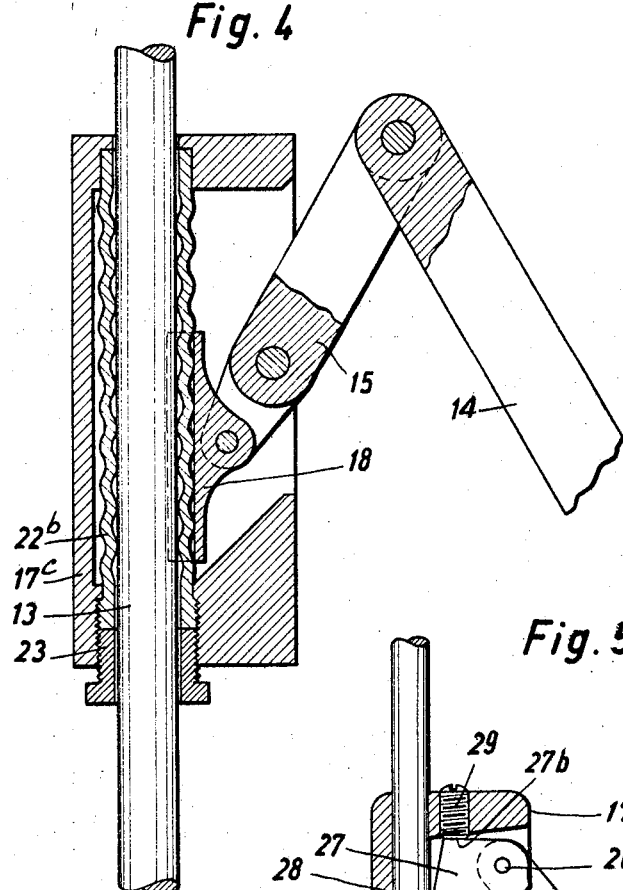
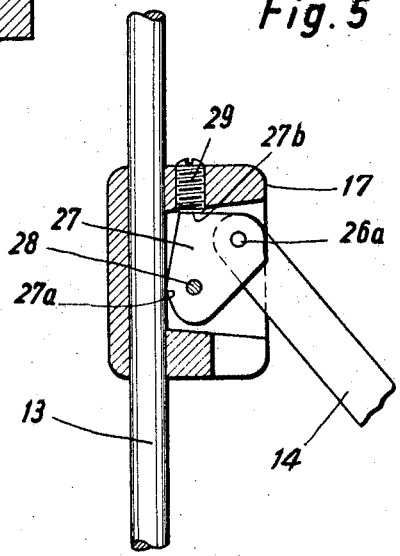

3,424,280
APPARATUS FOR HOLDING A MOVABLE
MEMBER SUCH AS A DROP-LEAF DOOR
Antonius Hettich, 219 Schwarzenmoor,
Herford, Westphalia, Germany
Filed Nov. 28, 1966, Ser. No. 597,423
Claims priority, application Germany, Nov. 27, 1965,
K 57,765
U.S. Cl. 188—67     9 Claims
Int. Cl. F16b 21/00; E05f 5/02

ABSTRACT OF THE DISCLOSURE

An apparatus for restraining a drop-leaf of a cupboard includes a tie-rod pivotally connected to the leaf and, through a mechanical connection using a pressure member within a slide, which in turn is slidable on a guide rod fixed to the cupboard. The braking force of the pressure member varies with the force of the leaf dropping. The mechanical connection between the tie-rod and pressure member may be a bell crank lever or a pivotal connection. A brake lining may be provided and it may be in the form of a variable length tube surrounding the guide rod.

---

The invention concerns restraining apparatus for holding a moveable member such as a drop-leaf door carried on a cupboard.

To prevent a flap or leaf fitted to an article of furniture from dropping down heavily when opened it is known to provide leaf holders with arresting devices which decelerate the speed of the dropping leaf. Pneumatic or hydraulic slowing down devices are structurally complex and hence also costly to produce.

Furthermore it is known to provide restraining apparatus with two wedges which are subject to spring pressure. The disadvantage of these devices, however, is that the braking force, is established by the wedge angle and the spring design and remains constant over the whole opening range of a flap.

According to the invention restraining apparatus for holding a moveable member such as a drop-leaf door comprises a tie rod pivotally connected to the door, a slide housing slidably mounted on a friction guide bar and housing a pressure member for exerting pressure on the friction bar the pressure member being mechanically connected to the tie-rod so that the braking force increases as the leaf drops.

In a preferred embodiment the mechanical connection is a bell-crank lever hinged bar. This hinged bar may be pivoted in the slide housing accommodating the pressure shoe.

A particularly advantageous braking action is obtained in accordance with a further preferred embodiment by providing a brake lining between the pressure shoe and friction bar, which brake lining is preferably formed as an elastic hose enclosing the friction bar.

In a further preferred embodiment the pressure shoe and the hinged lever are combined as a single component. An additional adjusting screw permits the maximum braking pressure to be limited.

The invention will now be described further, by way of example, with reference to the accompanying drawings, in which:

FIG. 1 is a perspective view of a cabinet having a leaf held by a tie-bar with braking device;

FIG. 2 is a longitudinal section through the braking device in the disengaged position;

FIG. 3 is a section through a modified braking device in the braking position;

FIG. 4 is a section through a further embodiment of the braking device; and

FIG. 5 is a section through a further modified braking device.

A cabinet 10 as shown in FIG. 1, has an upper compartment which is adapted to be closed by a leaf 11. On the inside surface of the cabinet wall a smooth cylindrical metal friction guide bar 13 is secured by means of knock-in dowels 12a and 12b. A bell-crank lever tie-rod 14 is coupled by means of a housing 17 to the friction guide bar 13; its lower end is journalled to a securing strap 16 clamped to the leaf 11.

As shown in FIG. 2 the tie-rod is hingedly connected to a bell-crank lever 15 which is journalled in the housing 17 by means of an axle 15a. On the free end of bell-crank lever 15 is mounted a pressure shoe 18 which at its end face is urged by means of a compression spring 19 acting at right angles to a supporting surface against the friction bar 13 in the inoperative position. The spring 19 is supported on the housing indirectly against an angle plate 20 secured by means of a screw 21 in the housing.

A tube 22 is arranged as a brake lining between the friction bar 13 and the pressure shoe 18. As shown in FIG. 3, the bell-crank lever 15, presses the whole face of the shoe 18 against the tube 22 and hence against the friction bar 13 when the leaf 11 is initially lowered by pulling on the upper portion of leaf 11. An advantageous frictional force may be obtained by making the tube 22 of an elastic material such as plastics material.

With the cessation of the pull which is transmitted along the tie-rod 14, the spring 19 retains the pressure shoe 18 against the tube 22 only on one section; this causes the frictional force to be considerably reduced, so that the housing 17 is permitted to be displaced in the direction of the arrow A on the friction bar 13. The flap may hence be closed easily.

An alternative embodiment shown in FIG. 3 has a pressure shoe 18a fashioned with a braking surface which is pressed with its braking surface directly against the friction bar 13 mounted in a modified housing 17a.

In the embodiment shown in FIG. 4 the tube 22 is variable in length by means of an adjusting nut 23 mounted on one side in the housing 17. The tube 22 may be compressed by means of nut 23 so that it extends in undulated section and hence is not in contact with the whole surface of the pressure shoe.

During opening and in the open position the weight of the leaf 11 is transmitted through the tie-rod 14 to the bell-crank lever 15 mounted on the axle 15a in the housing 17, 17a (see FIGS. 2 to 4). The bell-crank lever 15 in turn transmits this force via the pressure shoe 18, 18a to the friction bar 13 directly or indirectly as a braking moment engaging at the theoretical point 30, see FIG. 3.

When the leaf 11 is being opened, the centre of gravity of the leaf moves progressively outwards and hence also does its turning moment. A large angle of opening results in a turning moment, a small angle of opening results in a small turning moment and due to a progressive opening angle an increasing force acts on the brake mechanism which compensates the increasing force and absorbs it. With a progressive opening angle of the leaf 11 and the enlargement of the acute angle between friction bar 13 and tie-rod 14 caused thereby and also with the forces being transmitted to point 30 (force arm $a_1$ and load arm $x_1$) increase (see FIG. 3) and hence form a moment providing a forces equilibrium. The braking device thereby compensates the different operational forces and ensures a constant soft braking guidance for the leaf.

In the alternative embodiment shown in FIG. 5 the tie-rod 14 is hingedly connected in the pressure shoe 27 by means of the pivot 26a. The pressure shoe 27 is mounted about a pivot 28 and has a brake projection 27a formed as an eccentric and which with the leaf in the open position is urged against the friction bar 13. At the upper end edge of the housing 17 an adjustment screw 29 is arranged, which limits the movement of the pressure shoe 27; the pressure shoe formed with a brake projection 27a which acts against the friction bar 13, may hence be adjusted so as to correspond with the leaf load.

If the leaf 11 when opening exerts a pull against the tie-rod 14, then the pressure shoe 27 is rotated about the pivot 28, causing the braking projection 27a to be pressed against the friction bar 13 with a force corresponding to the leaf load until the upper edge of the pressure shoe 27b is supported against the adjusting screw 29 which is adjusted to the leaf load. When closing the leaf 11, the braking projection 27a is rotated in the reverse direction about the pivot 28 thus being released from the friction bar 13.

The apparatus in accordance with the invention for holding leaves or the like operates silently; it has only a few individual components which ensure a reliable braking action when the leaf drops down on the one hand, and ready displacement of the upper end of the tie-rod during closing of the leaf on the other hand.

The invention also provides a restraining apparatus for a moveable member such as a leaf having a simple structure providing a smooth braking of the leaf movement, the braking moment of which is regulated automatically in dependence upon the movement force acting on the apparatus.

I claim:

1. Apparatus for arresting movement of a moveable member carried on a support member, such as a drop-leaf door carried on a cupboard, the apparatus comprising; a tie rod, pivotal means connecting the tie rod to one of the members, a guide bar, connecting means rigidly securing the guide bar to the other of said members, a slide slidable on the guide bar, a moveable pressure member moveably carried on the slide, and mechanical means connecting the tie rod to the moveable pressure member to cause the pressure member to move and exert a frictional force on the guide bar for arresting the moveable member with a variable force when the moveable member is moved.

2. Apparatus as in claim 1 wherein the mechanical means is a bell crank lever having one end pivoted to the slide and the other pivoted to the pressure member, and a pivotal connection intermediate the ends of the bar crank lever to the slide.

3. Apparatus as in claim 1 further comprising a brake lining between the pressure member and the guide bar.

4. Apparatus as in claim 3 wherein the brake lining is an elastic tube surrounding the guide bar within the slide.

5. Apparatus as in claim 4 wherein the elastic tube is variable in length by an adjustable device carried by the slide.

6. Apparatus as in claim 1 further comprising a compression spring carried by the slide and biasing the pressure member into engagement with the guide bar.

7. Apparatus as in claim 1 wherein the mechanical means is a pivotal connection between one end of the tie rod and the pressure member, and the pressure member is pivotally connected to the slide.

8. Apparatus as in claim 7 wherein the pressure member has a braking surface formed as an eccentric projection.

9. Apparatus as in claim 8 further comprising an adjusting screw carried by the slide adjustable to variably limit the movement of the pressure member.

References Cited

UNITED STATES PATENTS 2,815,528  12/1957  Murray _____ 16—82

JAMES T. McCALL, *Primary Examiner.*

J. L. KOHNEN, *Assistant Examiner.*

U.S. Cl. X.R.

16—82